(12) United States Patent
Laube

(10) Patent No.: US 8,555,463 B1
(45) Date of Patent: Oct. 15, 2013

(54) GROOMING TOOL WITH VACUUM COLLECTION

(76) Inventor: Kim E. Laube, Thousand Oaks, CA (US)

( * ) Notice: Subject to any disclaimer, the term of this patent is extended or adjusted under 35 U.S.C. 154(b) by 690 days.

(21) Appl. No.: 11/406,166

(22) Filed: Apr. 18, 2006

(51) Int. Cl.
 *A47L 9/06* (2006.01)
(52) U.S. Cl.
 USPC .......................................... 15/415.1; 119/606
(58) Field of Classification Search
 USPC .......... 15/415.1, 322, 414, 344, 422.1; 30/133
 See application file for complete search history.

(56) References Cited

U.S. PATENT DOCUMENTS

| | | | | |
|---|---|---|---|---|
| 1,106,231 | A | * | 8/1914 | Marshall .......................... 15/314 |
| 1,878,345 | A | * | 9/1932 | Suter ................................ 15/367 |
| 2,297,735 | A | * | 10/1942 | Allen ............................... 30/133 |
| 2,564,339 | A | * | 8/1951 | Nerheim .......................... 55/357 |
| 2,634,451 | A | * | 4/1953 | Dow ................................. 15/323 |
| 2,696,666 | A | * | 12/1954 | Snead .............................. 30/133 |
| 2,697,876 | A | * | 12/1954 | Blanchard ....................... 30/133 |
| 2,914,849 | A | * | 12/1959 | Watkins ........................... 30/133 |
| 3,368,277 | A | * | 2/1968 | Vevea .............................. 30/133 |
| 3,384,919 | A | * | 5/1968 | Jording et al. .................. 15/339 |
| 3,574,885 | A | * | 4/1971 | Jones ............................... 15/393 |
| 4,077,122 | A | * | 3/1978 | Rollor et al. .................... 30/133 |
| 4,194,262 | A | * | 3/1980 | Finley et al. .................... 15/314 |
| 4,333,203 | A | * | 6/1982 | Yonkers ........................... 15/321 |
| 4,408,366 | A | * | 10/1983 | Goldsmith ....................... 15/321 |
| 4,879,784 | A | * | 11/1989 | Shero .............................. 15/322 |
| 5,095,853 | A | * | 3/1992 | Kruger ........................... 119/606 |
| 5,113,547 | A | * | 5/1992 | Mayhew .......................... 15/322 |
| 5,157,805 | A | * | 10/1992 | Pinter .............................. 15/322 |
| 5,377,411 | A | * | 1/1995 | Andriotis ........................ 30/133 |
| 5,493,752 | A | * | 2/1996 | Crouser et al. .................. 15/321 |
| 5,545,080 | A | * | 8/1996 | Clowers et al. ............... 451/359 |
| 5,555,643 | A | * | 9/1996 | Guasch ............................ 34/443 |
| 5,768,748 | A | * | 6/1998 | Silvera et al. ................... 15/402 |
| 5,797,161 | A | * | 8/1998 | Campbell ........................ 15/322 |
| 5,860,677 | A | * | 1/1999 | Martins et al. .................. 285/26 |
| 5,924,202 | A | * | 7/1999 | Romani ........................... 30/133 |
| 5,960,515 | A | * | 10/1999 | Lu ................................. 15/415.1 |
| 5,991,973 | A | * | 11/1999 | Simpson ......................... 15/402 |
| D424,766 | S | * | 5/2000 | Martin ........................... D32/32 |
| 6,070,292 | A | * | 6/2000 | Langelaan ....................... 15/401 |
| D453,867 | S | * | 2/2002 | Zahuranec et al. ............ D32/31 |

(Continued)

OTHER PUBLICATIONS

U.S. Appl. No. 11/215,555, Kim Laube.

(Continued)

*Primary Examiner* — Lee D Wilson
*Assistant Examiner* — Jamal Daniel
(74) *Attorney, Agent, or Firm* — Dennis W. Beech

(57) ABSTRACT

The present invention may be used to groom animals, humans and textile objects, and to collect hair, debris and other matter. There may be a head with a top and bottom wall attached to two side walls to define a front side opening. The top and the bottom walls may have a generally trapezoidal shape and the front side opening may be larger than a back wall. The handle may have a conduit with a first end in communication with an interior of the head adjacent the back wall and a second end open at an exit end. The conduit may have a nondecreasing cross-sectional interior dimension from the first end to the second end. The first end diameter may be smaller than the back wall width. The head may have on the top wall a cavity adjacent the front side and an aperture for attachment of a grooming device.

1 Claim, 4 Drawing Sheets

(56) References Cited

U.S. PATENT DOCUMENTS

| | | | | |
|---|---|---|---|---|
| 6,453,848 | B1 * | 9/2002 | Hachey | 119/602 |
| 6,571,478 | B1 * | 6/2003 | Romani et al. | 30/133 |
| 6,782,846 | B1 | 8/2004 | Porter | |
| 6,955,137 | B2 | 10/2005 | Dunn et al. | |
| 7,077,076 | B2 | 7/2006 | Porter | |
| 7,107,887 | B2 * | 9/2006 | Whited | 83/13 |
| 7,159,274 | B2 * | 1/2007 | Freidell | 15/339 |
| 7,203,991 | B2 * | 4/2007 | Stephens et al. | 15/320 |
| 7,222,588 | B2 | 5/2007 | Porter | |
| 7,334,540 | B2 | 2/2008 | Porter | |
| 7,347,166 | B2 * | 3/2008 | Roman-Barcelo | 119/677 |
| 7,488,004 | B1 * | 2/2009 | Romani et al. | 285/278 |
| 7,509,926 | B2 | 3/2009 | Porter | |
| D590,111 | S * | 4/2009 | Wiljanen et al. | D32/32 |
| D670,454 | S * | 11/2012 | Sherk et al. | D30/158 |
| 8,312,594 | B2 * | 11/2012 | Stoy et al. | 15/415.1 |
| 2005/0044659 | A1 * | 3/2005 | Rickman | 15/415.1 |
| 2005/0076467 | A1 * | 4/2005 | Stephens et al. | 15/321 |
| 2005/0103172 | A1 * | 5/2005 | Bohne et al. | 83/168 |
| 2005/0140137 | A1 * | 6/2005 | Lee | 285/7 |
| 2006/0230619 | A1 * | 10/2006 | Williams et al. | 30/133 |
| 2011/0185578 | A1 * | 8/2011 | Landrie et al. | 30/133 |

OTHER PUBLICATIONS

Exhibits for Kim E. Laube Declaration to be filed on Aug. 14, 2009, for Litigation in the U.S. District Court, Eastern District of Missouri, Eastern Division. Case No. 4:08-CV-00367-ERW, Filed Feb. 26, 2008.

* cited by examiner

GROOMING TOOL WITH VACUUM COLLECTION

BACKGROUND OF THE INVENTION

This invention relates to devices used to groom animals, humans and textile objects, for example carpets, that include a system to collect loose hair and debris. The new device with vacuum system incorporates a tool holder with a vacuum inlet nozzle and conduit. A constriction or choke location may be positioned at an inlet nozzle and a conduit connection.

Various hair collection systems may be known for animal grooming tools. This may be particularly true for hair cutting devices or hair clippers. An example of a hair clipper device with vacuum hair collection system may be found in U.S. patent application Ser. No. 11/215,555, filed Aug. 29, 2005. Vacuum apparatus for use in the animal care industry may not include provision for attachment of a variety of tools for use in grooming with the vacuum inlet or collection adjacent to the tool that may be producing loose hair and other debris separated from an animal. In addition, vacuum tools for use with animals, humans or textile objects may not include a constriction location in a forward end of the vacuum channel near the inlet to induce any tendency for hair, debris or other matter to accumulate and clog the vacuum channel to occur near the inlet for ease of removal. Often the air flow in a vacuum channel may be restricted by clogging in a hose or conduit location that may require disassembly to clear any restriction.

SUMMARY OF THE INVENTION

The present invention is directed to devices to groom animals, humans and textile objects, and to collect hair, debris and other matter. A head may be attached to a handle. The head may have a top wall and a bottom wall attached to a right side wall and a left side wall to define a front side opening. The top wall and the bottom wall may have a generally trapezoidal shape and the front side opening may be larger than a back wall. The handle may have a conduit therethrough with a first end in fluid communication with an interior of the head adjacent the back wall and a second end open at an exit end of the handle. The conduit may have a nondecreasing cross-sectional interior dimension from the first end to the second end. The first end may have a diameter no larger than a width of the back wall. The head may have on the top wall in an outer surface a cavity adjacent the front side and an aperture for attachment of a grooming device.

These and other features, aspects and advantages of the present invention will become better understood with reference to the following drawings, description and claims.

DETAILED DESCRIPTION

Figure 1:
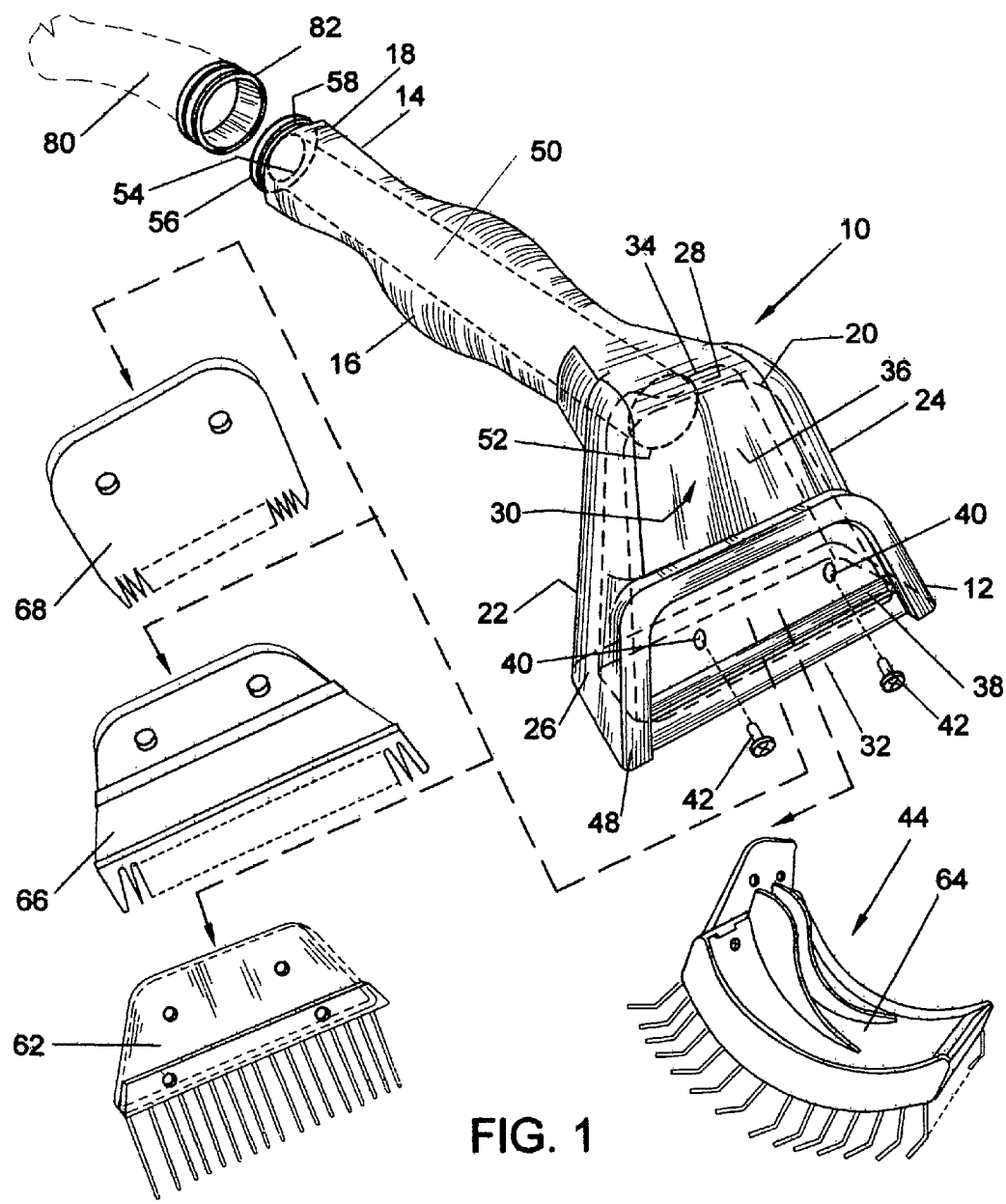
FIG. 1 illustrates a top perspective view of a grooming tool according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 5, a grooming tool 10 may have a head 12 attached to a handle 14. The head 12 may have a generally trapezoidal-shaped top wall 20 and bottom wall 22 as viewed at a wall side, a generally rectangular shaped right side wall 24 and left side wall 26, a rectangular back wall 28 and an open front side 32 to form an inlet nozzle 30. The front side 32 opening may be larger than the back wall 28. The intersections of the walls may be curved.

The handle 14 may have a conduit 50 disposed interior thereto with a first end 52 open and in fluid communication with the interior of the inlet nozzle 30 adjacent to the back wall 28 and with a second end 54 at an exit end 56 of the handle 14. The diameter of the first end 52 may be equal to or smaller than the width of the back wall 24 or rear end 34 of the bottom wall 22. The relative size of the first end 52 may create a constriction or choke location adjacent the back wall 28. The back wall 28 may be of generally rectangular flat form or may be curved at a radius that may be approximately equal to the radius of the first end 52. The constriction may serve to define a location where any collection of hair and debris may most probably close or clog the vacuum channel that may be defined by the inlet nozzle 30, the conduit 50 and a vacuum hose 80 all in fluid communication with a vacuum apparatus. This may reduce any tendency for hair, debris or other matter to restrict flow further downstream of the first end 52, for example, in the conduit 50 or in a vacuum hose 80 that may be attached to the exit end 56. Inducing any tendency of hair and debris to restrict flow in the vacuum channel to occur in the inlet nozzle 30 may facilitate the clearing of any collection of hair and other matter to open the vacuum channel for continued use of the grooming tool 10 by a user.

The head 12 on an outer surface 36 of the top wall 20 adjacent the front side 32 may have a cavity 38 that may be generally linear and parallel to the front side 32 for receipt of a protruding element of a cutting blade 66, 68 or other grooming device 44. The top wall 20 may have a pair of apertures 40 for threadable engagement of fasteners 42, such as screws, for attachment of a grooming device 44. Examples of grooming devices 44 may be a comb 62, a brush 64, a large cutting blade 66 or small cutting blade 68 and like devices useful in grooming.

Figure 2:
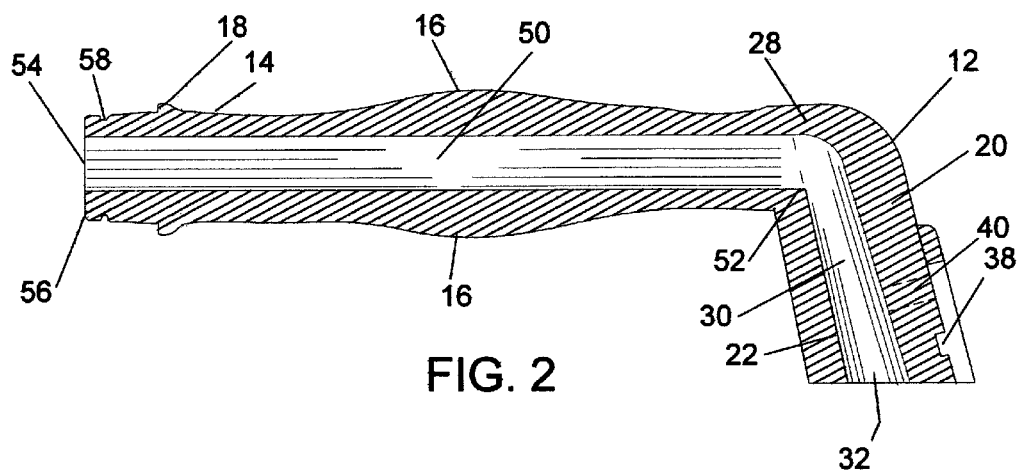
FIG. 2 illustrates a side cross-section view of a grooming tool according to an embodiment of the invention.
Figure 3:
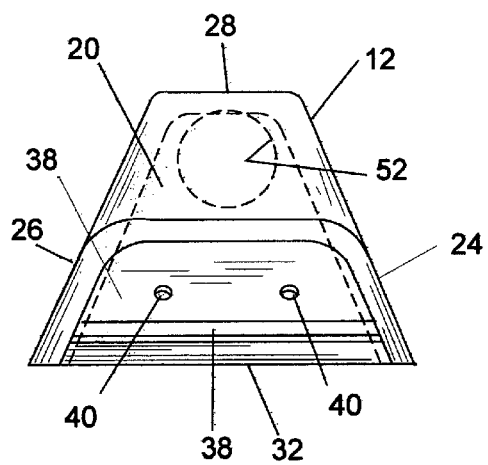
FIG. 3 illustrates a top end view of a grooming tool according to an embodiment of the invention.
Figure 4:
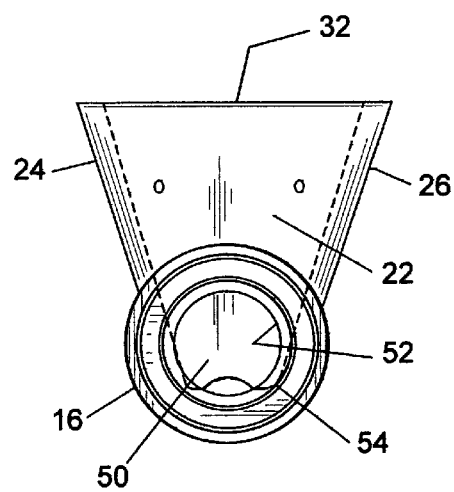
FIG. 4 illustrates a bottom end view of a grooming tool according to an embodiment of the invention.
Figure 5:
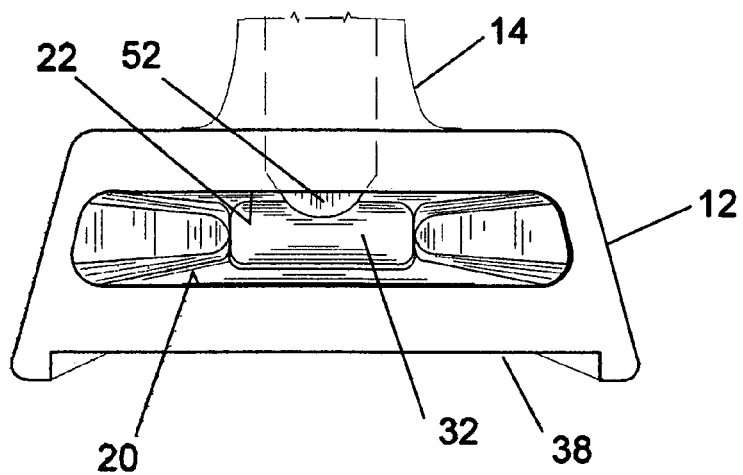
FIG. 5 illustrates a front view of a head and partial handle according to an embodiment of the invention.

The handle 14 outer surface 16 may be a constant diameter circular form or may have a curved contoured shape as best viewed in FIG. 2. The contour may have a relatively larger diameter outer surface 16 intermediate the head 12 and the exit end 56 to aid in a user gripping the handle 14. There may be a raised portion 18 adjacent the exit end 56 that may have a diameter slightly larger than a diameter of a vacuum hose 80 that may be attached to the exit end 56. The exit end 56 may have a groove 58 for use in attaching the vacuum hose 80. The cavity 38 may aid in retaining a grooming device 44 in the top 20. There may also be a raised retainer wall 48 formed on the outer surface 36 adjacent the front side 32 to aid in retaining a grooming device 44.

The conduit 50 longitudinal axis may be positioned at approximately a 100 degree angle relative to the bottom wall 22 of the head 12.

Figure 6:
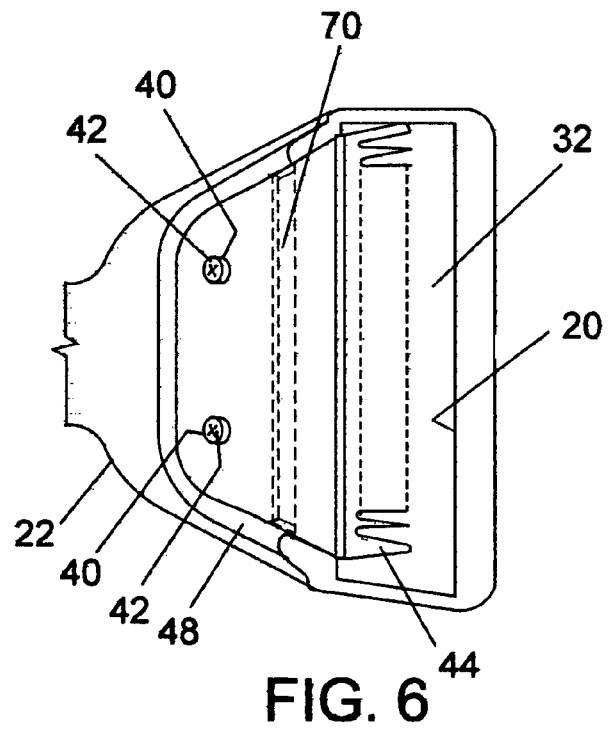
FIG. 6 illustrates a bottom perspective view of a head of a grooming tool according to an embodiment of the invention.

Referring to FIG. 6, a second cavity 70 may be formed in bottom wall 22 adjacent the front side 32. The bottom wall 22 may have a pair of apertures 40 for threadable engagement of fasteners 42 for attachment of a grooming device 44. There may also be a raised retainer wall 48.

Figure 7:
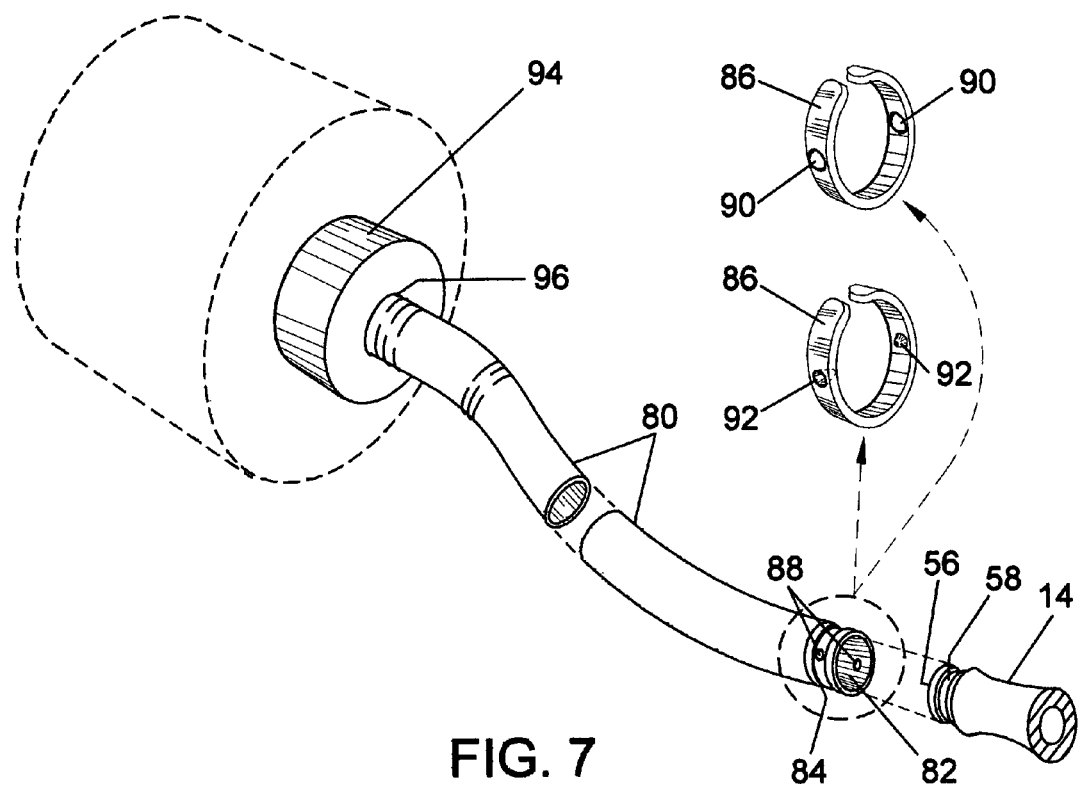
FIG. 7 illustrates a perspective view of a vacuum hose with band spring fastener according to an embodiment of the invention.
Figure 8:
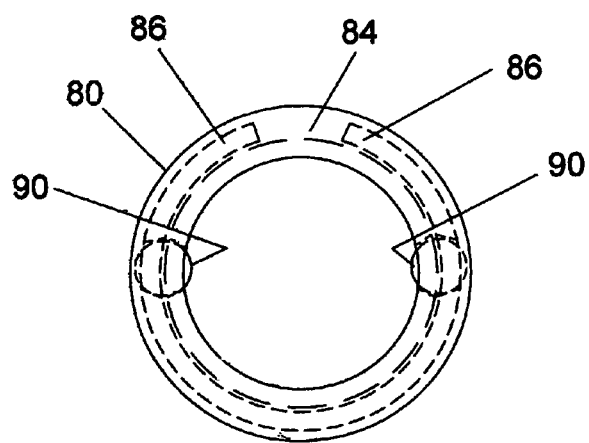
FIG. 8 illustrates an end view of a vacuum hose according to an embodiment of the invention.

Referring to FIGS. 7 and 8, the vacuum hose end 82 may have a spring groove 84 formed therein for receipt of an annular band spring 86. The spring groove 84 may have one or more groove apertures 88 communicating with the interior of the vacuum hose 80. The groove apertures 88 may allow one or more ball bearing 90, spring protrusions 92 or the like to have a portion positioned interior to the vacuum hose 80 when the band spring 86 may be positioned in the spring groove 84. There may be a vacuum cleaner connector 94 attached to the vacuum hose 80 at the end 96 opposite the hose end 82.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device to groom animals, humans and textile objects and to collect hair, debris and other matter comprising:

a head with a handle;

said head having a top wall and a bottom wall attached to a right side wall and a left side wall to define a front side opening to form an inlet nozzle interior to said head wherein said top wall and said bottom wall having a generally trapezoidal shape with said front side opening larger than a back wall attached to said top wall, said bottom wall, said right side wall and said left side wall;

said handle of sufficient length to grasp by hand having a conduit therethrough with a first end in fluid communication with said inlet nozzle of said head adjacent said back wall and a second end open at an exit end of said handle;

said conduit having a nondecreasing cross-sectional interior dimension from said first end to said second end and said first end having a diameter smaller than a width of said back wall inner surface to define an open, unobstructed channel from said inlet nozzle to said second end;

said head on said top wall in an outer surface having a cavity therein adjacent said front side and said top wall having an aperture therein for attachment of a grooming device; and said exit end attachable to a vacuum source.

* * * * *